US007363179B1

(12) United States Patent
Missell et al.

(10) Patent No.: US 7,363,179 B1
(45) Date of Patent: Apr. 22, 2008

(54) SYSTEMS AND METHODS FOR PREDICTING RUNABILITY OF A PRINT SUBSTRATE

(75) Inventors: Adam Missell, Webster, NY (US); James Adams, East Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 11/639,951

(22) Filed: Dec. 15, 2006

(51) Int. Cl.
*G06F 19/00* (2006.01)

(52) U.S. Cl. ........................................................ 702/81

(58) Field of Classification Search .................. 702/81, 702/84; 162/140, 162; 347/16, 104; 399/21, 399/401
See application file for complete search history.

(56) References Cited

U.S. PATENT DOCUMENTS

| | | | | |
|---|---|---|---|---|
| 3,885,962 A * | 5/1975 | MacClaren | .................. | 430/60 |
| 5,839,014 A * | 11/1998 | Takahashi et al. | ............ | 399/21 |
| 2004/0212649 A1 * | 10/2004 | Ouchi | ......................... | 347/16 |

* cited by examiner

*Primary Examiner*—Bryan Bui
(74) *Attorney, Agent, or Firm*—Pillsbury Winthrop Shaw Pittman LLP

(57) ABSTRACT

Systems and methods for determining printing performance or runability of a print substrate to be used as an image-receiving substrate in electrophotographic, electrostatographic, xerographic and like devices, including printers, copiers, scanners, facsimiles, and including digital, image-on-image, and like devices. Embodiments pertain to digitally optimizing print substrates.

23 Claims, 3 Drawing Sheets

SYSTEMS AND METHODS FOR PREDICTING RUNABILITY OF A PRINT SUBSTRATE

TECHNICAL FIELD

The present disclosure relates generally to methods for determining printing performance or runability of a print substrate to be used as an image-receiving substrate in electrophotographic, electrostatographic, xerographic and like devices, including printers, copiers, scanners, facsimiles, and including digital, image-on-image, and like devices. More particularly, the embodiments pertain to a method that can predict the runability of a specific print substrate, such as paper, including the optimal moisture content to give optimal runability, and provide insight into which parameters cause undesired machine performance for each paper substrate.

BACKGROUND

In electrophotography, also known as xerography, electrophotographic imaging or electrostatographic imaging, the surface of an electrophotographic plate, drum, belt or the like (imaging member or photoreceptor) containing a photoconductive insulating layer on a conductive layer is first uniformly electrostatically charged. The imaging member is then exposed to a pattern of activating electromagnetic radiation, such as light. Charge generated by the photoactive pigment move under the force of the applied field. The movement of the charge through the photoreceptor selectively dissipates the charge on the illuminated areas of the photoconductive insulating layer while leaving behind an electrostatic latent image. This electrostatic latent image may then be developed to form a visible image by depositing oppositely charged particles on the surface of the photoconductive insulating layer. The resulting visible image may then be transferred from the imaging member directly or indirectly (such as by a transfer or other member) to a print substrate, such as transparency or paper. The imaging process may be repeated many times with reusable imaging members.

The manufacture of lightweight coated papers for use in digital imaging systems has been largely unsuccessful for paper manufacturers. "Lightweight" is generally known to be less than 120 gsm, and typically, 90 gsm. Without specific knowledge of the driving forces behind runnability, or how well a paper runs on printing press, a manufacturer would need to run many expensive production trials in order to hopefully find a way to manufacture lightweight coated paper that exhibits good runability.

To achieve a successful product by iteration is costly, time-consuming and has a relatively low level of success. Even if this iterative process is successful, the manufacturer then runs the risk of not being certain of which parameters are driving the desired performance, and it would be difficult to consistently repeat the desired performance. It is very costly to run a design of experiment (DOE) on the paper machine to determine which factors are driving the acceptable performance. The alternative choice would be to leave all manufacturing parameters static to avoid impacting performance, but this option would result in less flexible and more costly manufacturing as some manufacturing variables that are not critical to performance would be left static. Additionally, assessing performance without a predictive measure of runability would require access to expensive equipment. Predictive testing for lot acceptance would also require large runs of paper on digital equipment (such as Xerox Corporation DC2060 or iGen3 digital imaging systems), exhausting time and money and generating a large quantity of waste. For example, over 10,000 sheets of paper may be required to fully assess "jam rate." Jam rate is also referred to as the shut down rate (SDR). This rate is the number of times per 10,000 sheets run that the equipment shuts down or jams. In order to determine whether a product will have a low SDR, large quantities of paper need to be run to be statistically significant. Having a predictive test that could be performed on 1 or 2 sheets of paper to predict the same would save significant time and money.

Thus, there is a need to find a method for determining a relationship function linking performance to a measurable parameter or property. More specifically, there is a need for a predictive method that could be used to evaluate print substrates, especially lightweight coated paper substrates, so that digitally optimized print substrates can be successfully and consistently manufactured without large amounts of time or money.

BRIEF SUMMARY

According to embodiments illustrated herein, there is provided a method for determining runability of a paper or print substrate, that addresses the needs discussed above.

An embodiment may include a method for determining runability of a print substrate, comprising determining a contraction index which is a ratio of contraction of a print substrate to starting moisture, determining a jam rate which is a number of jams occurring per every million sheets of the print substrate at the starting moisture, and determining a correlation between the jam rate and the contraction index, wherein the jam rate as a function of the contraction index gives a predictive measure of runability of the print substrate and the predictive measure is used to optimize runability parameters of the print substrate.

In another embodiment, there is provided a computer readable medium having a program instruction stored thereon for executing a computer to predict a measure of runability of a print substrate, comprising receiving a contraction of a print substrate at a plurality of starting moistures, plotting a graph of each contraction corresponding with the plurality of starting moistures as a function of each starting moisture, wherein a linear relationship represented by the graph is a measure of the ratio of contraction of the print substrate to the starting moisture, determining a contraction index from the linear relationship, receiving a number of jams that occur for the print substrate per every million sheets at the plurality of starting moistures and determine a jam rate, and plotting the jam rate as a function of the contraction index to give a predictive measure of runability of the print substrate, wherein the predictive measure is used to optimize runability parameters of the print substrate.

Another embodiment may include a system for determining runability of a print substrate, comprising an expansimeter for determining a contraction index which is a ratio of contraction of a print substrate to starting moisture, a digital imaging machine for determining a jam rate which is a number of jams occurring per every million sheets of the print substrate at the starting moisture, and a computer for determining a correlation between the jam rate and the contraction index, wherein the correlation of the jam rate as a function of the contraction index is a predictive measure of runability of the print substrate and the predictive measure is used to optimize runability parameters of the print substrate.

BRIEF DESCRIPTION OF THE DRAWINGS

For a better understanding of the present embodiments, reference may be had to the accompanying figures.

DETAILED DESCRIPTION

Figure 1:
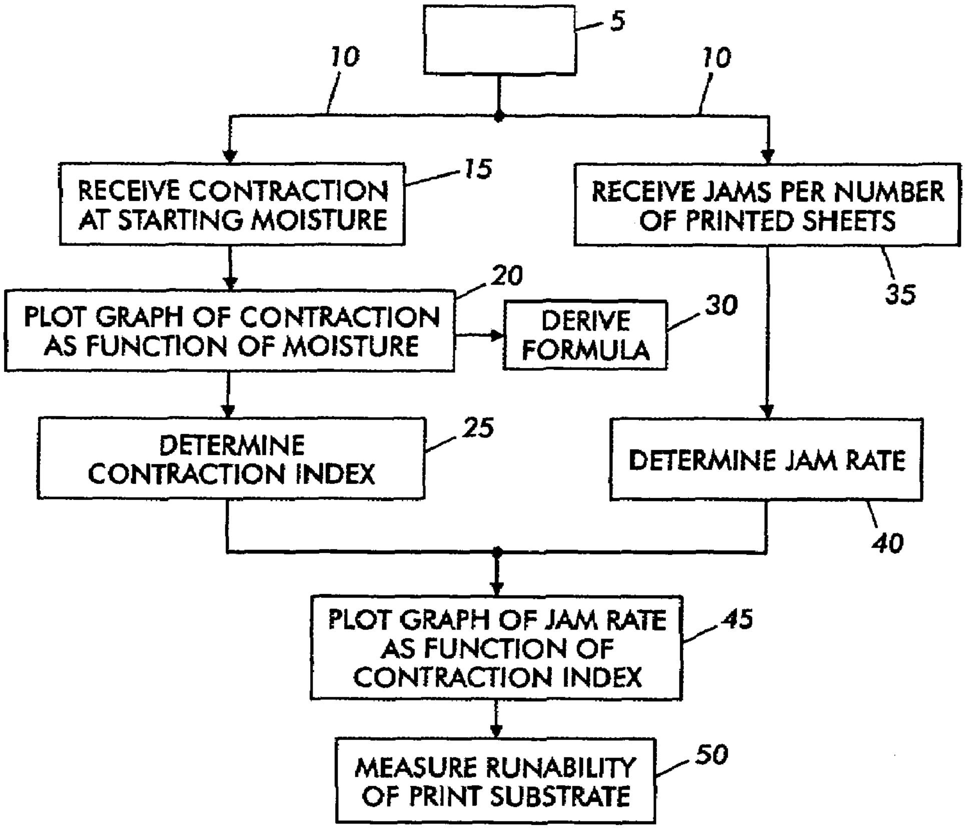
FIG. 1 is a schematic diagram of data carrier for predicting runability according to an embodiment of the present disclosure.

It is understood that other embodiments may be utilized and structural and operational changes may be made without departure from the scope of the embodiments disclosed herein.

To cost-effectively manufacture of lightweight coated paper, especially one at 90 gsm with competitive pages per inch (PPI) such as 600 PPI, the factors that impact performance must be known and understood. Without this understanding of the key factors, a manufacturer must then turn to iteration processes that involve costly machine trials. According to embodiments illustrated herein, there is provided a system and method for determining runability of a paper or print substrate to address these issues.

It was found that by measuring contraction or cross-directional shrinkage tendency of a paper substrate tested at a run moisture, the performance (e.g., jam rate and deletion rate) could be predicted. In addition to providing a performance predictor and means to understand key production inputs, the methods provide a manner with which to intelligently select an optimal moisture content for the paper type. While a lower moisture will decrease the tendency to contract, choosing a moisture that is too low will lead to additional issues such as static and poor image quality. By measuring the contraction tendency of a paper at various run moistures, the optimal moisture content at which to manufacture that specific paper type to balance the jam rate, without risking static or image quality, can be selected using the methods described herein.

As sheets are run through digital imaging devices they have a tendency to lose moisture, particularly at the fuser. Papers of lighter weight, such as those lightweight coated substrates described herein, are prone even more so to significant moisture loss due to their high surface area to weight ratio. As would be expected, a sheet of paper will contract upon losing moisture and may have a tendency to deform due to this contraction. There are known test methods, used for 20# xerographic bond paper, that can predict the degree and directional tendency of paper sheet deformation by performing a split-sheet contraction (SSC) test. The split-sheet contraction test splits a sheet in the z-direction to produce two sheets or strips, one machine direction (MD) strip and one cross-machine direction (CD) strip. Each strip is then split, using tape, into felt and wire side sections. Following removal of the tape, the resulting four strips are conditioned in a high humidity environment and the length is measured. The humidity is then reduced and the decrease in length is measured. The four length shrinkages are analyzed and combined into a ratio indicative of curl called the split-sheet contraction ratio. The analysis provides insight into the driving force behind undesired machine performance and corrections can be made during production based on the understanding of imbalances provided by the test. However, while this test method works for 20# xerographic bond, it has no correlation for lightweight coated paper such as, for example, 90 gsm gloss coated paper at 600 PPI. In addition, this known method tends to be slow and cumbersome to use. Because the known split-sheet contraction analysis could not be used for lightweight coated paper, the present embodiments were devised.

It is generally understood that paper has a tendency to contract three times more in the cross-machine direction than in the machine direction. This is due to the tendency for a sheet to lose moisture from between the fibers, which are more aligned in the machine-direction, and contract. While the fibers themselves tend to lose moisture and contract in both directions, the loss is generally not significant along the length of the fiber. Therefore, a sheet running in a digital imaging equipment with the machine direction being in the process direction will have an increased tendency to contract across the process direction. This contraction is consistent with the formation of deletions experienced in the Xerox Corporation iGen3 family, and is suspected to be a contributing factor to runnability issues in the Xerox Corporation DC2060 family. In fact, high speed video of 45# coated paper in iGen3 machines has shown that such deformations do occur, although the video itself is not capable of demonstrating the specific cause.

The present embodiments thus provide a model that can be used on lightweight coated paper substrates to determine a predictive measure of runability. The model presented is based on 90 gsm 2-side coated gloss paper in the 525-650 PPI range being run with the machine direction (MD) in the process direction to maximize process-direction beam strength.

According to embodiments illustrated herein, there is provided a system and method for determining runability of a paper or print substrate, so that lightweight coated paper substrates for use in digital imaging systems can be manufactured consistently with optimal runability. The systems and methods are directed to digitally optimize runability parameters for lightweight coated paper. More particularly, there is disclosed herein a system and method for determining runability of a paper/print substrate.

The method involves determining a contraction index, determining a jam rate, and determining a correlation between the jam rate and the contraction index, wherein the jam rate as a function of the contraction index is a measure of runability of the print substrate, such as paper. In embodiments, the contraction of the print substrate can be measured at 5 starting moistures, for example, 80% relative humidity ("RH"), 65% RH, 50% RH, 35% RH and 20% RH. Relative humidity, as used in the present disclosure, is: [(actual vapor density/saturation vapor density)×100]. A contraction index is a ratio of contraction of a print substrate to starting moisture. A jam rate is a number of jams occurring per every million sheets of the print substrate at a starting moisture. The contraction of the print substrate is measured at a plurality of starting moistures, and can be in embodiments, a cross-directional shrinkage value. In embodiments, the contraction at the plurality of starting moistures may be measured by running an expansimeter, which measures the hygroexpansivity of sheet materials, in reverse. The contraction values are received and used to plot each contraction corresponding with the plurality of starting moistures as a function of each starting moisture in a graph, wherein a linear relationship represented by the graph is a measure of the ratio of contraction of the print substrate to the starting moisture. In addition, a formula for the linear relationship can be determined to further extrapolate contraction at additional starting moistures.

The number of jams occurring per every million sheets may be tracked or measured by a digital imaging system, such as for example, Xerox Corporation DC2060 or iGen3 machine, or any other machine where the desired performance would like to be known. The digital imaging system may have a machine direction that proceeds in a process direction. The number of jams is received and used to determine a jam rate which is then plotted against the contraction index to produce a graph with the jam rate as a function of the contraction index. A formula determined from the linear relationship shown in the graph to measure runability of the print substrate.

Other embodiments include incorporating the above steps into a set of instructions readable by a computer and stored on a data carrier or otherwise computer readable medium, such that the method is automated. FIG. 1 shows a flow chart of such computer readable instructions according to the embodiments. For example, in embodiments, a data carrier 5 carrying computer readable instructions 10 is configured such that when the computer readable instructions are executed, they cause a computer to automatically perform a method for determining optimal runability for a print substrate, such a paper. In such embodiments, the instructions 10 cause the computer to receive the contraction of a print substrate at the plurality of starting moistures 15. In a particular embodiments, the a contraction value is measured for 5 starting moistures, 80% RH, 65% RH, 50% RH, 35% RH and 20% RH. In particular embodiments, the contraction measured is a cross-directional shrinkage value. A plot of each contraction corresponding with the plurality of starting moistures as a function of each starting moisture is graphed 20, and the linear relationship represented by the graph is a measure of the ratio of contraction of the print substrate to the starting moisture. A contraction index is thus determined from the linear relationship 25. In addition, a formula for the linear relationship may be determined to further extrapolate contraction at additional starting moistures 30. The number of jams that occur for the print substrate per every million sheets at the plurality of starting moistures is received 35 and a jam rate is determined 40. The jam rate is plotted as a function of the contraction index 45 to measure runability of the print substrate 50.

Figure 2:
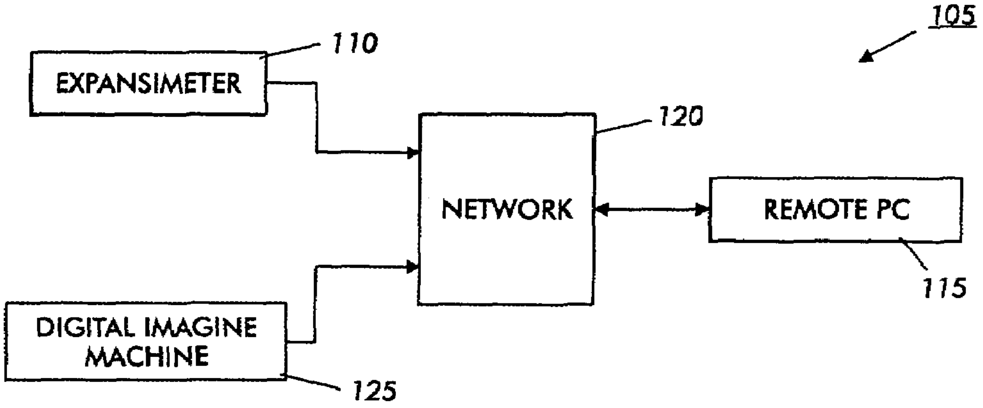
FIG. 2 is a schematic diagram of a system for predicting runability according to an embodiment of the present disclosure.

In yet further embodiments, there is provided a system for determining runability of a print substrate, as depicted in FIG. 2. The system 105 operates by determining a contraction index wherein the various contraction values of a print substrate, like paper, at a plurality of starting moistures is measured and sent by an expansimeter 110. In a particular embodiments, the contraction of the print substrate is measured at 5 starting moistures of 80% RH, 65% RH, 50% RH, 35% RH and 20% RH. The data is received by a remote PC 115 which plots the contraction as a function of starting moisture and the resulting graph represents a linear relationship that can be used to generate the contraction index. The data may be sent over a network 120 via wired or wireless communication. In addition, a formula for the linear relationship may be determined using a computer program, such as Microsoft Excel Spreadsheet, so that the formula can be used to further extrapolate contraction at additional starting moistures. The contraction may be a cross-directional shrinkage value.

A digital imaging machine 125 is used to determine a jam rate by tracking the number of jams occurring per every million sheets of the print substrate, and the tracked number may be sent to the remote PC 115 to determine the jam rate. Subsequently, a correlation between the jam rate and the previously determined contraction index may be determined on the remote PC 115. Again, a computer program such as Microsoft Excel Spreadsheet may be used to graph the correlation by plotting a plurality of data points of jam rate as a function of the contraction index. The resulting correlation of jam rate as a function of the contraction index is a measure of the runability of the print substrate. The resulting graph teaches what moisture content should be selected for a given product to achieve a desired jam rate. In addition, the graph allows for a comparison of multiple trials (or design configurations of the media) so that the most desirable configuration can be selected to achieve the lowest jam rate at the most desirable moisture content. In embodiments, the actions described above are automated so that the system and method used can generate runability of a print substrate without manual input.

As described above, the methods of determining runability of a paper or print substrate may involve receiving data measured with an expansimeter. Strips of lightweight coated paper are cut in the cross-machine direction and affixed in the expansimeter. The expansimeter is then sealed and the base tubes are leveled. Full sheets of the same paper substrate are loaded into a sealed humidity chamber. The humidity inside both the expansimeter and humidity chamber may be raised to 80%. At 80% RH, the sheets are allowed to equilibrate for 1 hour. After one hour, the full sheets are removed from the humidity chamber and bagged to be tested for moisture content of the sample at 80% RH using the oven-dried moisture technique commonly used in the industry. The base tubes in the expansimeter are leveled and the micrometer readings taken. After the readings, the humidity setting may be changed to 10%, in which the samples are allowed to again equilibrate for 1 hour. After the one hour, the base tubes are again leveled and micrometer readings taken.

The final micrometer reading, taken at the second condition (e.g., 10% RH), is subtracted from the initial reading, taken at the first condition (e.g., 80% RH), yields the contraction (in mils or 1/1000 of an inch) or cross-directional shrinkage value (in mils) that the paper undergoes, starting from the moisture content provided by the full page sample taken at 80% RH.

The expansimeter may repeat this process at a plurality of different moistures, for example, substituting 65%, 50%, 35% and 20% RH for the initial 80% RH, to measure the cross-directional shrinkage values of the tested paper substrate at those specific starting moistures. Subsequently, the plurality of data points may be received by a remote PC and a graph of each contraction corresponding with the plurality of starting moistures can be plotted as contraction (in mils) as a function of moisture (% starting). The formula for this linear relationship is provided by, for example, Microsoft Excel Spreadsheet, allowing the interpolated contraction to be calculated for typical run moistures.

For each sample, 10,000 sheets of 17×11" paper are run in auto-duplex mode on a digital imaging system such as, for example, the Xerox Corporation DC2060 machine. The moisture at which the paper is tested is recorded. The number of jams that occur in each run test is tracked and received by a remote PC to determine a jam rate expressed in jams/million sheets. The jam rate for the paper substrate at each moisture is correlated to the contraction measured for the corresponding moisture and the data points are plotted as jam rate as a function of contraction (in mils). The resulting linear relationship represents a transfer function used to predict runability on the DC2060 machine, using only a few sheets. The resulting graph teaches how contraction indices correspond to jam rates. The transfer function can be used to determine the jam rate of an untested media of new grade without the large amounts of time or materials previously required. By determining the point on the graph that corresponds to the run moisture, the jam rate of the new media can be predicted. In addition, the runability can be determined without use of expensive digital imaging systems.

Different samples may be taken using the above-described methods to evaluate different grades of 90 gsm-coated paper and corresponding performance level. The runability determined by using the present embodiments thus show that the performance of a lightweight coated product on digital imaging systems is improved by minimizing the tendency for the product to contract in the CD. The embodiments also provide data with which to find optimal moisture for each specific paper substrate. The embodiments provide further insight into the different fundamental factors and properties that drive performance of a specific paper substrate and allows for successful and efficient manufacture of lightweight coated papers for use in digital imaging systems where it has otherwise not been achieved.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

A model based on 90 gsm 2-side coated gloss paper in the 525-650 PPI range being run with the machine direction (MD) in the process direction (to maximize process-direction beam strength) was used.

Six samples of different production runs and grades of 90 gsm-coated paper, believed to demonstrate varying levels of performance, were used. The following procedure was conducted for each sample set:

Strips of lightweight coated paper were cut in the cross-machine direction (CD). The dimensions of the strips were 5" (along the CD)×0.5" (along the MD). The strips were affixed in an expansimeter, which was then sealed and the base tubes were leveled. Full sheets of the same paper were then loaded into a sealed humidity chamber. The humidity inside both the expansimeter and humidity chamber was raised to 80%. When the chambers reached 80% RH a timer was set for 1 hour, during which time the sheets were allowed to equilibrate. After the 1 hour period, the full sheets were removed from the humidity chamber and bagged to be tested for moisture content of the sample at 80% RH using the oven-dried moisture technique commonly used in the industry. The base tubes in the expansimeter were leveled and the micrometer readings were taken. The humidity setting was then changed to 10% and the chamber was allowed to reach 10% RH. The samples were again allowed to equilibrate at for 1 hour, but this time at 10% RH. After the 1 hour, the base tubes were again leveled and micrometer readings were taken.

Figure 3:
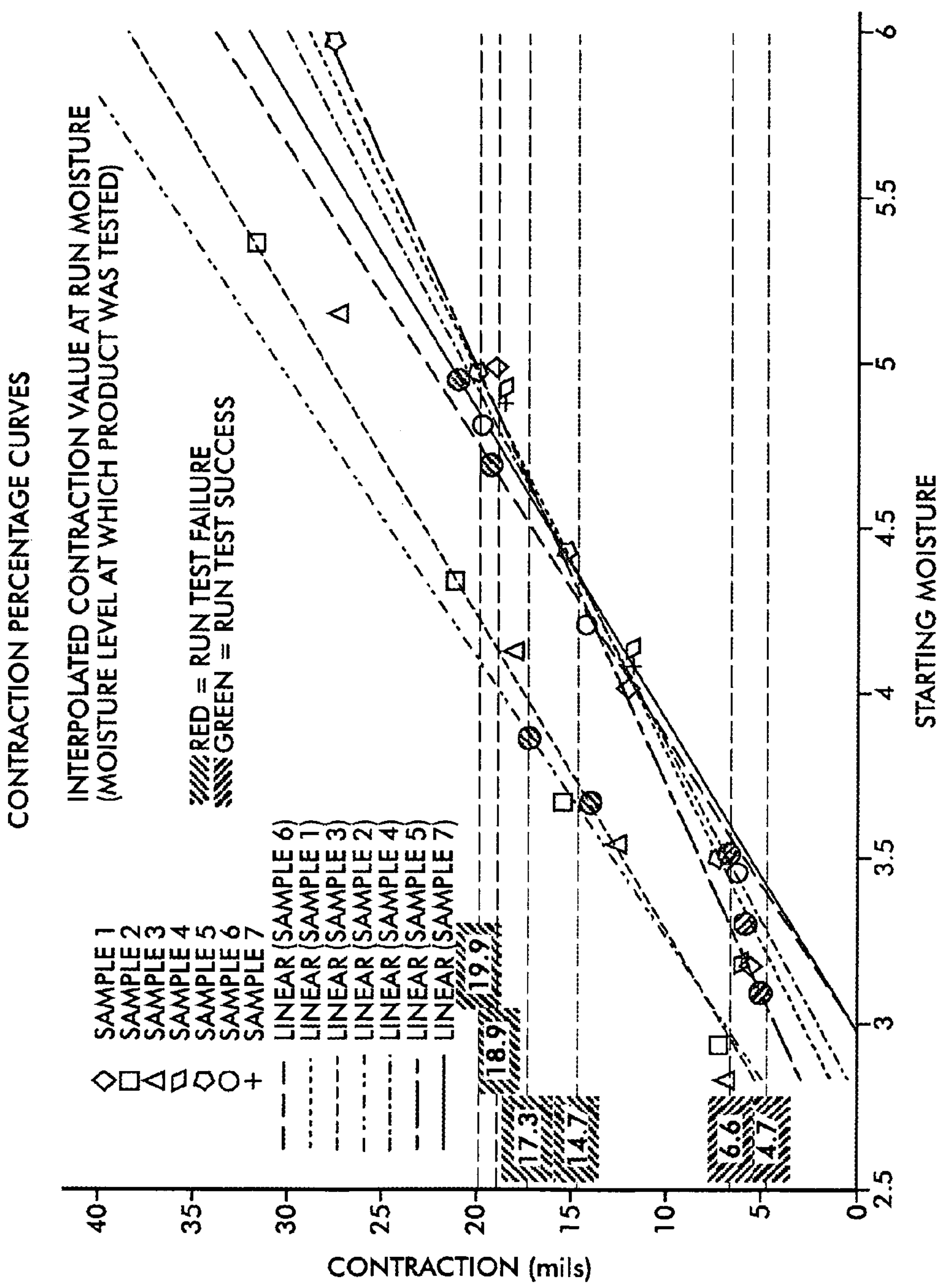
FIG. 3 is a linear relationship representing contraction as a function of run moisture according to an embodiment of the present disclosure.

The final micrometer reading (conditioned at 10% RH) was subtracted from the initial reading (at 80% RH), yielding the contraction (in mils) that the paper underwent when starting from the moisture content provided by the full page sample taken at 80% RH. The process was subsequently repeated substituting 65%, 50%, 35% and 20% RH for the initial 80% RH. The end result was 5 data points that were subsequently plotted as contraction (in mils) as a function of moisture (% starting). The formula for this linear relationship is provided by Microsoft Excel, allowing the interpolated contraction to be calculated for typical run moistures, as shown in FIG. 3.

For each paper sample, 10,000 sheets of 17×11" paper were run in auto-duplex mode on a Xerox Corporation DC2060 imaging system. The paper substrate was 90 gsm coated. The moisture at which the paper was tested was recorded. The number of jams that occurred in this run test were tracked, and expressed in jams/million sheets. The data points for each product were plotted as jam rate as a function of contraction (in mils), yielding the graph shown in FIG. 4.

Figure 4:
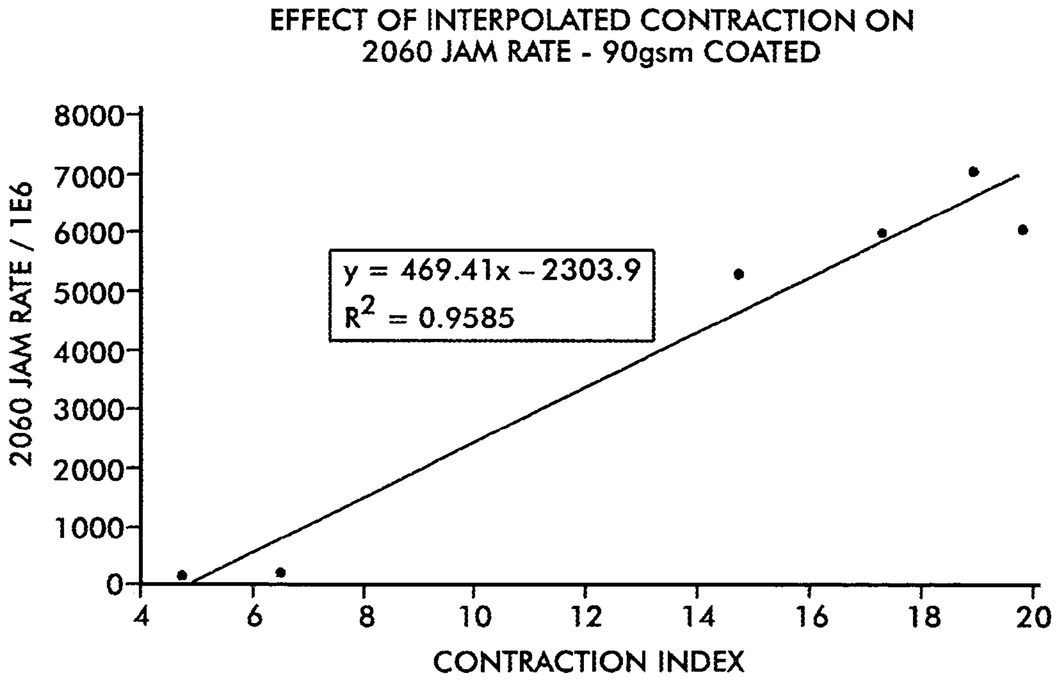
FIG. 4 is a linear relationship representing jam rate as a function of contraction according to an embodiment of the present disclosure.

FIG. 4 is proposed as a transfer function that can be utilized to predict the run performance on a DC2060 machine using only a few sheets. The correlation illustrated by FIG. 4 can be used to predict performance of a grade or production lot using only small quantities of paper and without access to digital imaging systems. The correlation further provides insight into the root cause of performance, and suggests that one could improve performance of a lightweight coated product on digital imaging systems by minimizing the tendency for the product to contract in the CD. There are various methods to achieve this in the paper making process such as, for example, fiber alignment and refining levels.

All the patents and applications referred to herein are hereby specifically, and totally incorporated herein by reference in their entirety in the instant specification.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A method for determining runability of a print substrate, comprising:

(a) determining a contraction index which is a ratio of contraction of a print substrate to starting moisture;

(b) determining a jam rate which is a number of jams occurring per every million sheets of the print substrate at the starting moisture; and (c) determining a correlation between the jam rate and the contraction index, wherein the jam rate as a function of the contraction index gives a predictive measure of runability of the print substrate and the predictive measure is used to optimize runability parameters of the print substrate.

2. The method of claim 1, wherein (a) further comprises receiving a contraction of the print substrate at a plurality of starting moistures; and plotting a graph of each contraction corresponding with the plurality of starting moistures as a function of each starting moisture, wherein a linear relationship represented by the graph is a measure of the ratio of contraction of the print substrate to the starting moisture.

3. The method of claim 2 further including determining a formula for the linear relationship to further extrapolate contraction at additional starting moistures.

4. The method of claim 2, wherein the contraction is measured with an expansimeter.

5. The method of claim 1, wherein (b) further comprises receiving a number of jams that occur for the print substrate per every million sheets at the plurality of starting moistures.

6. The method of claim 5, wherein the number of jams is tracked with a digital imaging machine.

7. The method of claim 6, wherein the digital imaging machine has a machine direction that proceeds in a process direction.

8. The method of claim 1, wherein (c) further comprises plotting a graph of the jam rate as a function of the contraction index to measure runability of the print substrate.

9. The method of claim 1, wherein the print substrate is paper.

10. The method of claim 1, wherein the contraction is a cross-directional shrinkage value.

11. The method of claim 1, wherein the contraction of the print substrate is measured at the plurality of starting moistures of 80% RH, 65% RH, 50% RH, 35% RH and 20% RH.

12. A computer readable medium having a program instruction stored thereon for executing a computer to predict a measure of runability of a print substrate, comprising:

(a) receiving a contraction of a print substrate at a plurality of starting moistures;

(b) plotting a graph of each contraction corresponding with the plurality of starting moistures as a function of each starting moisture, wherein a linear relationship represented by the graph is a measure of the ratio of contraction of the print substrate to the starting moisture;

(c) determining a contraction index from the linear relationship;

(d) receiving a number of jams that occur for the print substrate per every million sheets at the plurality of starting moistures and determine a jam rate; and (e) plotting the jam rate as a function of the contraction index to give a predictive measure of runability of the print substrate, wherein the predictive measure is used to optimize runability parameters of the print substrate.

13. The data carrier of claim 12, wherein (b) further includes determining a formula for the linear relationship to further extrapolate contraction at additional starting moistures.

14. The data carrier of claim 12, wherein the print substrate is paper.

15. The data carrier of claim 12, wherein the contraction is a cross-directional shrinkage value.

16. The data carrier of claim 12, wherein the contraction of the print substrate is measured at the plurality of starting moistures of 80% RH, 65% RH, 50% RH, 35% RH and 20% RH.

17. A system for determining runability of a print substrate, comprising:

(a) an expansimeter for determining a contraction index which is a ratio of contraction of a print substrate to starting moisture;

(b) a digital imaging machine for determining a jam rate which is a number of jams occurring per every million sheets of the print substrate at the starting moisture; and (c) a computer for determining a correlation between the jam rate and the contraction index, wherein the correlation of the jam rate as a function of the contraction index is a predictive measure of runability of the print substrate and the predictive measure is used to optimize runability parameters of the print substrate.

18. The system of claim 17, wherein (a) further comprises receiving a contraction of the print substrate at a plurality of starting moistures; and plotting a graph of each contraction corresponding with the plurality of starting moistures as a function of each starting moisture, wherein a linear relationship represented by the graph is a measure of the ratio of contraction of the print substrate to the starting moisture.

19. The system of claim 18 further including determining a formula for the linear relationship using Microsoft Excel Spreadsheet to further extrapolate contraction at additional starting moistures.

20. The system of claim 17, wherein (c) further comprises plotting the jam rate as a function of the contraction index using Microsoft Excel to measure runability of the print substrate.

21. The system of claim 17, wherein the print substrate is paper.

22. The system of claim 17, wherein the contraction is a cross-directional shrinkage value.

23. The system of claim 17 wherein the contraction of the print substrate is measured at the plurality of starting moistures of 80% RH, 65% RH, 50% RH, 35% RH and 20% RH.

* * * * *